United States Patent
Kecskemeti et al.

(10) Patent No.: US 10,747,788 B2
(45) Date of Patent: Aug. 18, 2020

(54) CLUSTERING OF GEOGRAPHICAL CONTENT

(71) Applicant: Oath Inc., New York, NY (US)

(72) Inventors: Csaba Kecskemeti, San Jose, CA (US); Robert Ormandi, Redwood City, CA (US)

(73) Assignee: Oath Inc., New York, NY (US)

(*) Notice: Subject to any disclaimer, the term of this patent is extended or adjusted under 35 U.S.C. 154(b) by 176 days.

(21) Appl. No.: 15/332,838

(22) Filed: Oct. 24, 2016

(65) Prior Publication Data

US 2018/0113881 A1 Apr. 26, 2018

(51) Int. Cl.
 *G06F 16/30* (2019.01)
 *G06F 16/29* (2019.01)
 *G06F 16/28* (2019.01)

(52) U.S. Cl.
 CPC ........... *G06F 16/29* (2019.01); *G06F 16/287* (2019.01)

(58) Field of Classification Search
 CPC .................. G06F 17/30876; G06F 16/955
 USPC ....... 707/607, 609, 687, 705, 769, 790, 813, 707/821
 See application file for complete search history.

(56) References Cited

U.S. PATENT DOCUMENTS

| | | | | |
|---|---|---|---|---|
| 8,200,251 B2* | 6/2012 | Huang | ............... | H04W 64/003 455/457 |
| 9,798,822 B2* | 10/2017 | Liu | ...................... | G06F 16/955 |
| 2012/0011124 A1* | 1/2012 | Bellegarda | ........... | G06K 9/6223 707/739 |
| 2013/0042123 A1* | 2/2013 | Smith | ................... | G06F 9/5077 713/300 |
| 2013/0282896 A1* | 10/2013 | Ge | .......................... | H04L 43/04 709/224 |
| 2015/0170000 A1* | 6/2015 | Yang | .................... | G06K 9/6267 382/224 |
| 2017/0359680 A1* | 12/2017 | Ledvina | .................. | H04W 4/02 |

OTHER PUBLICATIONS

Malkin, et al, U.S. Appl. No. 15/331,083, filed Oct. 21, 2016, titled "Home Location Identification Using Grouped Location Data," 41 Pages.

Kecskemeti, et al, Prior Art Database Technical Disclosure, titled "Method and System for Discovering Offline Interests of Online Users," IP.com No. IPCOM000246612D, IP.com Electronic Publication Date Jun. 21, 2016, Copyright Yahoo! 2016, 3 Pages.

* cited by examiner

*Primary Examiner* — Sana A Al-Hashemi
(74) *Attorney, Agent, or Firm* — Cooper Legal Group, LLC (57) ABSTRACT

A method and apparatus for determining geographic clusters of geographical content may include computation of a first evaluation metric. The first evaluation metric may be descriptive of a distribution of geo-location points within a cluster of a plurality of geographic clusters. A second evaluation metric may also be computed that is descriptive of coherence of the plurality of geographic clusters. Geo-location points of the geographical content may be clustered based, at least in part on the first and second evaluation metrics.

23 Claims, 4 Drawing Sheets

CLUSTERING OF GEOGRAPHICAL CONTENT

FIELD

This disclosure relates generally to content processing, such as content clustering, for example, which may include clustering of geographical content.

INFORMATION

Clustering of content may be desirable in some instances. For example, users of computing devices, such as mobile and/or stationary computing devices may share one or more common characteristics, such as demographics, geographic locations, interests, or the like. At times, these or like shared characteristics may be collected and/or clustered to provide users with personalized messages, targeted offers, relevant on-line content items, etc. For example, a specific message, offer, coupon, or the like may be communicated to a computing device of a user having one or more common characteristics with other users of a common cluster. However, accuracy, relevance, and/or clustering precision may vary between clustering approaches. In some instances, processing costs of certain clustering approaches may increase as a size of associated clusters increases. Consequently, there may be a desire for more effective and/or more efficient clustering approaches.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Some example methods, apparatuses, and/or articles of manufacture are disclosed herein that may be used, in whole or in part, to facilitate and/or support one or more operations and/or techniques for clustering of geographical content, such as implemented in connection with one or more computing and/or communication networks and/or protocols (e.g., network protocols) discussed herein, for example. As alluded to previously, clustering of content, such as a geographical or like content, as one possible example, may be desirable in some instances. "Content," as the term used herein, location-related or otherwise, should be interpreted broadly and refers to signals, such signal packets, for example, and/or states, such as physical states on a memory device, for example, but otherwise is employed in a manner irrespective of format, such as any expression, realization, and/or communication, for example. Content may comprise, for example, any information, knowledge, and/or experience, such as, again, in the form of signals and/or states, physical or otherwise. In this context, "electronic," "digital," or "on-line content" refers to content in a form that although not necessarily capable of being perceived by a human, (e.g., via human senses, etc.) may nonetheless be transformed into a form capable of being so perceived, such as visually and/or audibly, for example. Non-limiting examples may include text, audio, images, video, combinations, or the like. Thus, content may be stored and/or transmitted electronically, such as before or after being perceived by human senses. In general, it may be understood that electronic and/or on-line content may be intended to be referenced in a particular discussion, although in the particular context, the term "content" may be employed for ease of discussion. Specific examples of content may include, for example, an e-mail message, text message, audio file, video file, web page, coordinates according to a suitable coordinate system (e.g., global, local, etc.), or any combination thereof. Claimed subject matter is not intended to be limited to these examples, of course.

In this context, "geographical content" refers to content indicative of geographical location. Examples of geographical content may include: geographic coordinates, such as a longitude and latitude pair, a Where on Earth Identifier (WOEID), and the like; location names and/or addresses (e.g., cities, states, provinces, regions, countries, and the like); device identifiers, such as Internet Protocol addresses (IP addresses); and other similar indications that may be descriptive of geographical location. Claimed subject matter is not so limited, of course. For example, in some instances, geographical content may comprise one or more altitude or like values.

At times, content, geographical or otherwise, may, for example, be clustered based, at least in part, on one or more characteristics common to users of computing devices, such as mobile and/or stationary computing devices. In this context, "client device" refers to any kind of special purpose computing device and/or special purpose apparatus capable of communicating with other computing apparatuses and/or devices through wired and/or wireless transmission and/or receipt of signals or like content over suitable computing and/or communications networks according to one or more protocols. Depending, at least in part, on an implementation, a client computing device may comprise, for example, a mobile computing device, a stationary computing device, or any combination thereof. A mobile computing device may comprise, for example, a client computing device that may from time to time have a position and/or location that changes. A stationary computing device may comprise, for example, a client computing device that may have a position and/or location that typically, although not necessarily, does not change. As a way of illustration, client computing devices, may include, for example, cellular telephones, satellite telephones, smart telephones, voice over internet protocol (VoIP) or IP telephones, desktop computers, personal digital assistants (PDAs), laptop computers, personal entertainment systems, tablet personal computers (PC), personal audio or video devices, personal navigation devices, e-book readers, or the like. Claimed subject matter is not so limited, of course. It should be noted that, for ease of description, mobile and stationary computing devices may be referred to herein interchangeably as "computing devices."

Continuing with the above discussion, users of computing devices may, for example, share one or more common characteristics, such as demographics, geographic locations, interests, or the like. At times, these or like common characteristics may, for example, be collected and/or clustered in a suitable manner to provide users with personalized messages, targeted offers, relevant on-line content, etc. For example, a specific message, offer, coupon, or the like may be communicated to a computing device of a user having one or more common characteristics with other users or computing devices of a common cluster. As such, it may be that, in some instances, clustering of geographical content, such as geo-location points of interest, as one possible example, may be desirable. In this context, "geo-location point" refers to a geospatial point represented via appropriate geographic coordinate (e.g., latitude, longitude, etc.) values, global or otherwise, corresponding to a location of a computing device and/or co-located users. In certain simulations or experiments, it has been observed that a cluster of geo-location points may be representative of personalized points of interest (POIs) that may be sufficiently descriptive of common characteristics of users of that particular cluster (cumulatively referred to as "members") and, as such, may be of interest to these users. For instance, it has been observed that a particular geo-location point (e.g., a tourist attraction, etc.), services associated with a particular geo-location point (a hotel, restaurant, etc.), etc. frequented by some members of a cluster may be of interest—and, thus, recommended—to other members of the cluster. Thus, at times, in order to provide users of computing devices with more personalized on-line content, it may be desirable and/or useful to cluster these or like users, such as via corresponding geo-location points, for example. In some instances, this may, for example, improve relevancy of provided on-line content, facilitate and/or support user engagement, improve on-line services, increase revenue, or the like.

At times, clustering of geographical content, such as geo-location points, however, may present challenges. For example, in some instances, as a cluster size increases, content recommended based, at least in part, on relatively larger clusters may tend to be less relevant due, at least in part, to an increase of a geographical distance between a centroid of a cluster and geo-location points of the cluster. At times, this may, for example, be indicative of more diverse interests and, thus, a reduced likelihood of shared interests of respective cluster members. Another challenge may be that geographical content may be noisy, meaning that geo-location points representing computing device locations may be scattered or unevenly distributed, which may, for example, render assigning the geo-location points into clusters more difficult. In turn, this may, for example, make providing more relevant on-line content, such as personalized offers, targeted suggestions, advertisements, or the like (hereinafter referred to interchangeably as "content items") more challenging. Yet another challenge may be that, at times, as an average distance between cluster centroids decreases, geo-location points on the outskirts of one cluster may be closer to geo-location points on the outskirts of another cluster than to their respective centroid, which may also make content recommendations less relevant (e.g., content that may be interest for users of one cluster may be recommended to users of another cluster, etc.).

Thus, in some instances, to address these or like challenges, K-Means or like clustering may, for example, be utilized, at least in part, but may be less useful for scattered, noisy, etc. geographical content. More specifically, as alluded to previously, in certain simulations or experiments, it has been observed that maximizing an average distance between cluster centroids and minimizing an average distance (e.g., from a centroid, etc.) within a cluster may prove beneficial, such as with respect to clustering geographical content. Due, at least in part, to an uneven distribution and/or density of geo-location points, however, it may be difficult at times to minimize cluster size as well as maximize cluster distance using typical K-Means clustering. As such, it may be desirable and/or useful to determine a number of evaluation metrics, which may be applied to and/or used, at least in part, in connection with geographical content, K-Means clustered or otherwise, such as to implement one or more clustering approaches in a more effective and/or more efficient manner.

Thus, as will be discussed in greater detail below, to facilitate and/or support clustering of geographical content, a number of evaluation metrics may, for example, be computed and used, at least in part, to determine a geographic clustering of geo-location points within a plurality of geographic clusters. As will also be seen, a first evaluation metric may, for example, be descriptive of a distribution of geo-location points within a cluster of a plurality of geographic clusters, and a second evaluation metric may, for example, be descriptive of coherence of a plurality of geographic clusters. Thus, based, at least in part, on computed first and second evaluation metrics, an appropriate geographic clustering of applicable geo-location points may, for example, be determined and used, at least in part, to provide users with personalized messages, targeted offers, relevant on-line content, or the like, as was indicated.

Figure 1:
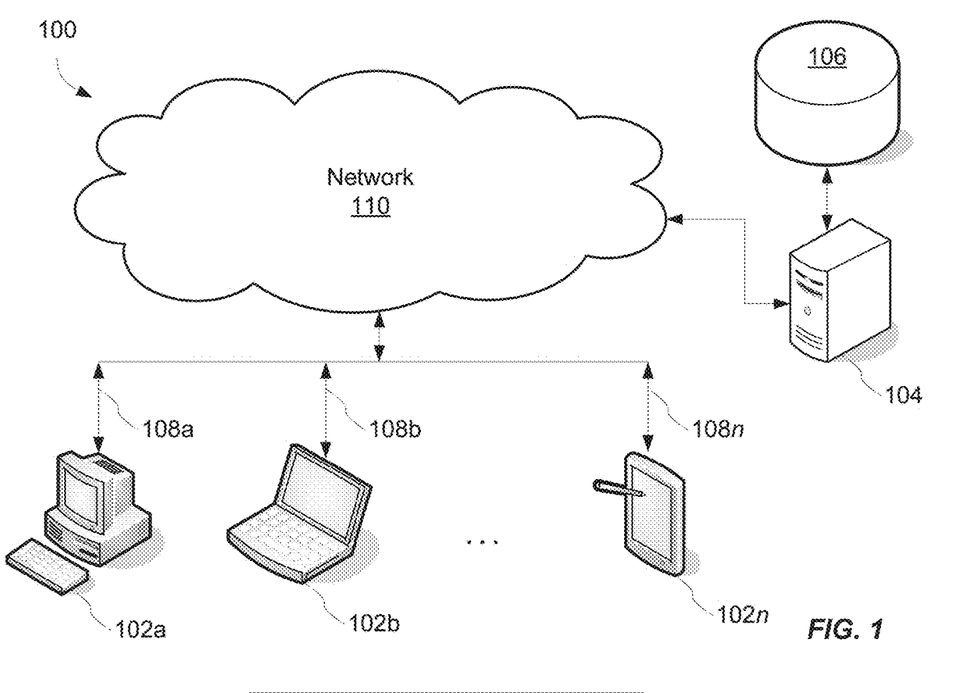
FIG. 1 is an illustration of an embodiment of a system according to an embodiment.

FIG. 1 illustrates an implementation of an example operating environment 100 that may be used, at least in part, to facilitate and/or support one or more operations and/or techniques for clustering of geographical content. As was indicated, in some instances, geographical content may comprise, for example, geo-location points corresponding to locations of computing devices, referenced herein as 102a, 102b, ... 102n, co-located with users. Geo-location points may, for example, be obtained, such as collected and/or stored via one or more appropriate techniques. Here, one or more crowdsourcing techniques may, for example, be used, at least in part, or otherwise considered, just to illustrate one possible implementation. Claimed subject matter is not so limited, of course. For example, in some instances, geo-location points may be obtained in connection with check-ins, on-line content delivery, user input, or the like. Geo-location points may, for example, be stored in any suitable memory or like repository, such as a database 106 as one or more signals and/or states. At times, database 106 may comprise one or more logs capturing appropriate location-related characteristics, such as via computing devices of co-located users and may comprise latitude, longitude, demographic, etc. values, click-related activity, appropriate identifiers, or the like.

As also illustrated, in some instances, computing devices 102a, 102b, ... 102n may be capable of communicating with one or more other computing devices, such as a computing device 104, for example, via network 110 using a number of communication links 108a, 108b, ... 108n, though claimed subject matter is not so limited. For example, at times, computing devices 102a, 102b, ... 102n may be capable of communicating with one or more other computing devices directly. Computing device 104 may comprise, for example, one or more servers capable of facilitating and/or supporting one or more operations and/or processes discussed herein. A particular example of an operating environment and/or associated computing devices will be discussed in greater detail below with reference to FIG. 5.

Even though a certain number of computing devices are illustrated herein, any number of suitable computing devices may be implemented to facilitate and/or support one or more techniques or processes associated with operating environment 100. For example, at times, network 110 may be coupled to one or more wired or wireless communication networks (e.g., WLAN, etc.) so as to enhance a coverage area for communications with computing devices 102a, 102b, ... 102n, computing device 104, database 106, or the like. Again, these are merely example implementations, and claimed subject matter is not limited in this regard.

Figure 2:
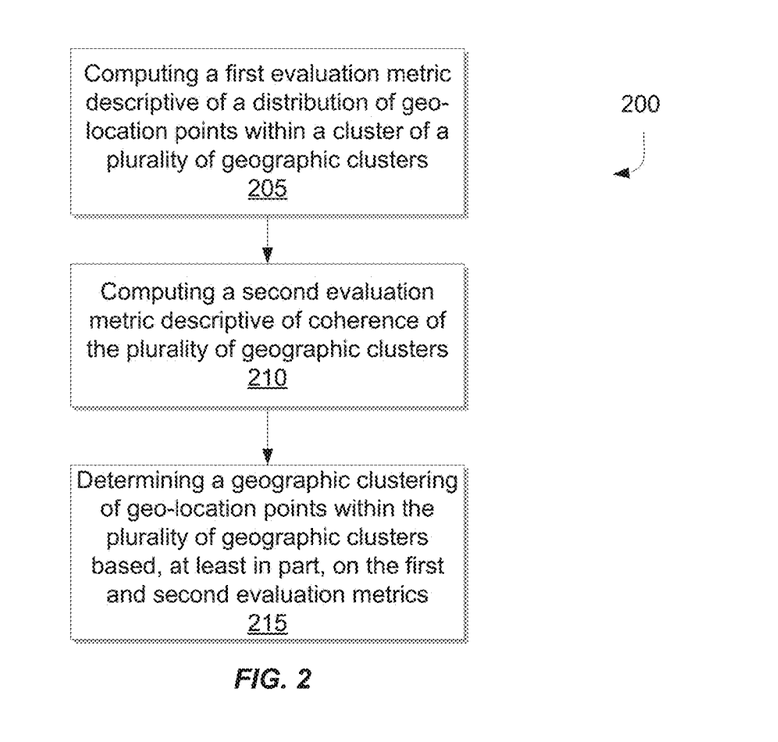
FIG. 2 is a flowchart illustrating an example method.

With this in mind, attention is now drawn to FIG. 2, which is a flow diagram illustrating an implementation of an example process 200 that may be performed, in whole or in part, to facilitate and/or support one or more operations and/or techniques for clustering of geographical content. It should be noted that content acquired and/or produced, such as, for example, input signals, output signals, operations, results, etc. associated with example process 200 may comprise and/or be represented via one or more digital signals and/or states. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 200 may, for example, begin at operation 205 with computing a first evaluation metric descriptive of a distribution of geo-location points within a cluster of a plurality of geographic clusters. Geo-location points may be selected from among a plurality of geographical content, such as from one or more logs stored at database 106 of FIG. 1, for example. As was indicated, at times, geo-location points may, for example, be clustered into a plurality of geographic clusters (e.g., via K-Means, etc.), and it may be desirable to evaluate a particular clustering approach of the geo-location points. In some instances, it may be desirable to determine appropriate clustering for geo-location points, such as prior to or in connection with particular clustering approach.

An embodiment of computing a first evaluation metric descriptive of a distribution of geo-location points within a cluster of a plurality of geographic clusters, such as shown by block 205, is discussed hereinafter. This embodiment may use, for instance, distances between geo-location points and a centroid at least in part to determine a number of clusters to use to meet suitable clustering. Suppose, for example, that for different values of K, where K refers to a number of clusters for a set of geo-location points, it may be possible to start with a K-Means clustering approach of K clusters and centroids $c_1$ to $c_K$, $C_K = \{c_1, \ldots, c_K\}$ comprising clustered geo-location points $D_K = \{D_1, \ldots, D_k\}$ over a base set $D = \cup_{i=1}^{K} D_i$. Here the vector $c_i \in \mathbb{R}^k$ denotes the ith cluster centroid and the set of vectors $D_j \subseteq \mathbb{R}^d$ represents the set of geo-location points assigned to cluster j. As shall be shown, this initial clustering approach may be evaluated using, at least in part, a first evaluation metric, as illustrated by block 205 of method 200, to compute an updated clustering approach, as an example.

For this example, a set of geo-location points may be denoted as: $N = |D|$ and for each $i \in \{1, \ldots, K\}$ the value of $N_i = |D_i|$. For an embodiment, the distance evaluation metric may comprise, for example, d: $\mathbb{R}^d \times \mathbb{R}^d \to \mathbb{R}$.

In an embodiment comprising a set of geo-location points (such as from a log), there may be a desire to place an emphasis on locality in clustering geo-location points. Thus, it may be possible to define a threshold function $S_T$ that accepts a possible clustering approach if clusters of the clustering approach have an approximated diameter less than or equal to a predefined threshold T (e.g., 500 meters, 1 km, etc.). Selection of a threshold T may be based at least in part on a desired application. For example, an application in proximity of a large venue, such as a stadium, may use a larger threshold (e.g., 1 km) while a smaller venue, such as a shopping mall, may use a smaller threshold (e.g., 500 m). Thus, as a threshold T decreases in size, average cluster diameter of resulting clustering approaches may also decrease in size. Consequently, decreasing threshold T may lead to a greater number of clusters (e.g., K), while increasing threshold T may lead to a smaller number of clusters. One sample threshold evaluation metric, such as for an implementation of block 205 of method 200, may be defined as shown in relation 1:

$$S_T = (C_K, D_K) = \mathbb{1}_{\left(\max_{i \in \{1, \ldots, K\}} \left(\max_{(x,y) \in D_i, x \neq y} (d(x, y))\right)\right) < T} \qquad (1)$$

In relation 1, the function $\mathbb{I}$ is a standard index function that returns 1 if the provided logical relation is true, otherwise 0. Thus, for example, for a given clustering approach, a determination may be made as to whether the clustering approach fits within a desired threshold. As seen, relation 1 compares distances between respective geo-location points of a cluster (e.g., x and y). It should be appreciated that as a number of geo-location points in a set increases, a processing time and/or resources that may be used to perform such a comparison may also increase (e.g., exponentially, etc.).

Figure 3:
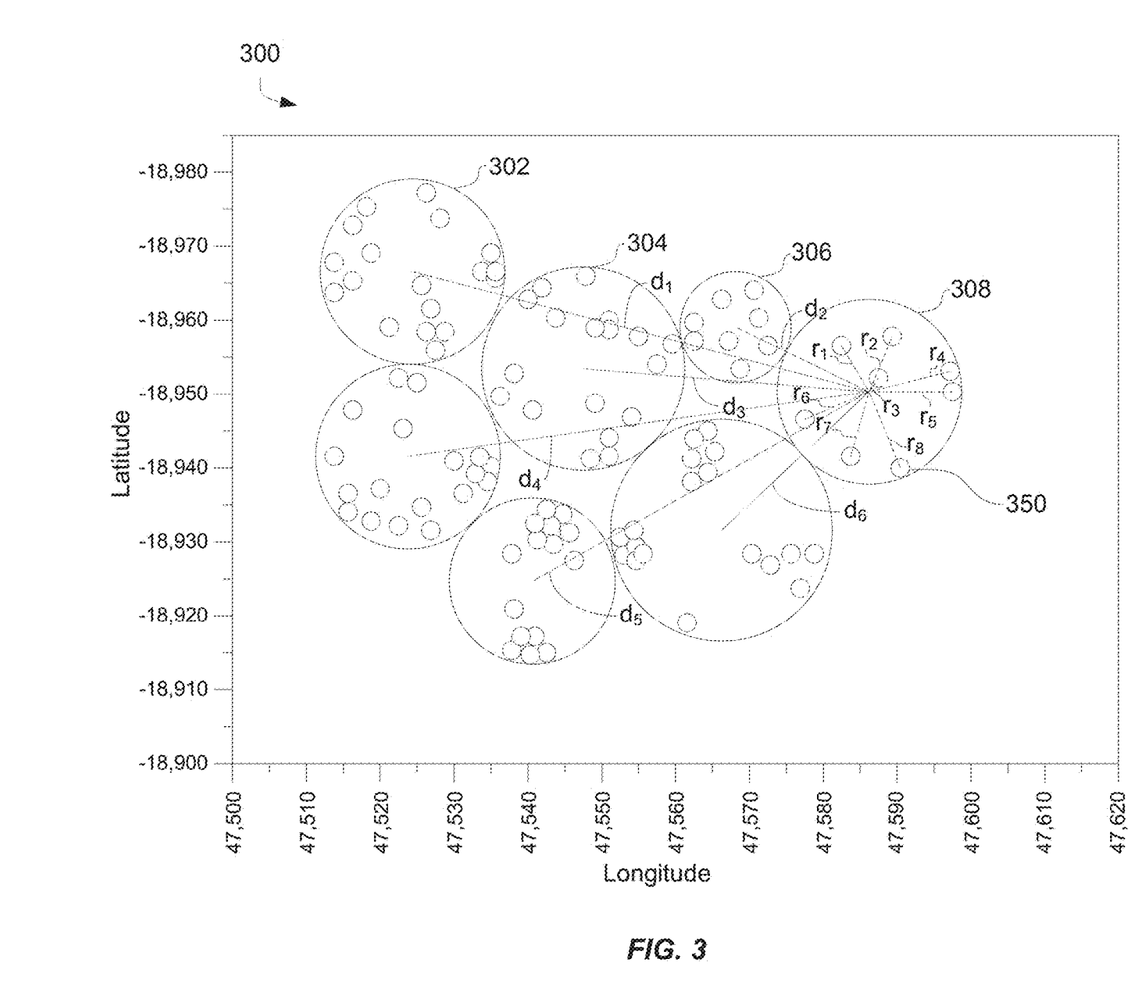
FIG. 3 comprises a plot of geo-location points clustered according to an implementation of a clustering approach.

In an embodiment, it may be possible to reduce a complexity of a calculation of relation 1 (e.g., reduce a computation cost). It may be instructive to refer to algorithmic categorization in terms of a relationship between input volume and processing resources using "big O notation." Thus, relation 2, proposes an O(n) simplification of relation 1 (which may be categorized as a $O(n^2)$ process), where n is the number of elements in a clustered population of geo-location points. In contrast to the geo-location point pair comparison of relation 1, relation 2 proposes instead comparing geo-location points of a cluster with a centroid of the cluster, thus obtaining a metric with a lower processing cost. Because relation 2 proposes a different comparison (e.g., geo-location points with a centroid rather than a geo-location point-pair combination) a different threshold (T) may be used (e.g., T*<T) to determine a maximum distance between geo-location points of a population and corresponding cluster centroids. Referring briefly to FIG. 3, as a way of illustration, distances may, for example, be determined between geo-location points 350 (of which only one is labeled, for ease of discussion) of cluster 308 and a centroid of cluster 308 and compared to yield a maximum distance. Distances between geo-location points of a cluster and a centroid of the cluster may be determined using one or more appropriate approaches (e.g., a difference between a longitude of a geo-location point and a longitude of a centroid, and a difference between a latitude of a geo-location point and a latitude of the centroid). By way of example, distances $r_1$-$r_8$ may be compared to yield a maximum distance (e.g., $r_8$ in the case of plot 300). A resulting maximum distance may then be compared with a threshold T* and a 1 or 0 returned, depending on whether a maximum distance is determined to be less than or greater than (or equal) to the threshold T*.

$$S_{T^*} = (C_K, D_K) = \mathbb{I}_{\left(\max_{i \in \{1,\ldots,K\}} \left(\max_{x \in D_i}(d(c_i, y))\right)\right) < T^*} \quad (2)$$

It is noted that though centers of circles in FIG. 3 are used to indicate centroids for clusters, this merely for ease in illustration and description and that actual centroids of respective clusters may be different. It is also noted that though clusters of plot 300 are illustrated using circles, this is merely to facilitate identification of the clusters and is not intended to convey any limitation as to geometry or form of geographical clusters.

Returning now to example process 200 of FIG. 2, at operations 210 a second evaluation metric descriptive of coherence of the plurality of geographic clusters may, for example, be computed. For instance, a second evaluation metric may be able to provide a qualitative measurement of a particular clustering approach, such as for purposes of clustering and/or cluster evaluation. A first and a second metrics may be used, at least in part, in any suitable combination and may yield, for example, one or more parameters useful to implement and/or update a particular clustering approach, as will be discussed hereinafter in conjunction with operation 215. Thus, there may also be a desire to find an acceptable clustering approach that may also take into account a relationship between points in a cluster and points in one or more adjacent clusters (e.g., such that geo-location points are closer to other geo-location points within a same cluster than geo-location points in other clusters, etc.).

In an embodiment of operation 210, an evaluation metric may also use at least in part a penalty factor, such as corresponding to a K value (e.g., corresponding to a number of clusters in a given clustering approach). For instance, a K value in a denominator of an evaluation metric may be such that as the denominator increases, the value resulting from the evaluation metric may decrease (e.g., inverse relationship). As such, an evaluation metric may, for example, be able to penalize one or more clustering approaches with relatively higher numbers of clusters. Additionally, an evaluation metric may be able to normalize one or more clustering approaches to enable comparison of different clustering approaches and, potentially, identification of clustering approaches that meet desired parameters. An embodiment of process 210 may use, for instance, distances between clusters, such as to determine a number of clusters to use to meet desired clustering, for example.

In an embodiment, operation 210 of process 200 may, for example, provide a qualitative measure of coherence of a particular clustering approach. Thus, in some instances, clustering coherence may, for example, be measured using a second evaluation metric $m_a$ as illustrated in relation 3:

$$m_\alpha(C_K, \mathcal{D}_K) = \frac{\alpha}{K \cdot N} \sum_{i=1}^{K} N_i \frac{\overbrace{\frac{1}{K-1} \sum_{c_j \in C_K, c_j \neq c_i} d(c_i, c_j)}^{\text{Average distance of centroids from centroid } i}}{\underbrace{\frac{1}{N_i} \sum_{x \in D_i} d(c_i, x)}_{\text{Average distance in cluster } i}} \quad (3)$$

An evaluation metric m in relation 3 may provide an estimate of coherence (e.g., clustering performance). A summation portion of relation 3 may measure a ratio of an average distance between centroids from a centroid i and an average distance between geo-location points of a cluster i and a centroid of cluster i. A ratio of distances may be averaged over particular clusters as a weighted average where the weights are determined based on a number of elements per cluster $$\left(\text{e.g., } \frac{1}{N_i}\right).$$

Figure 4:
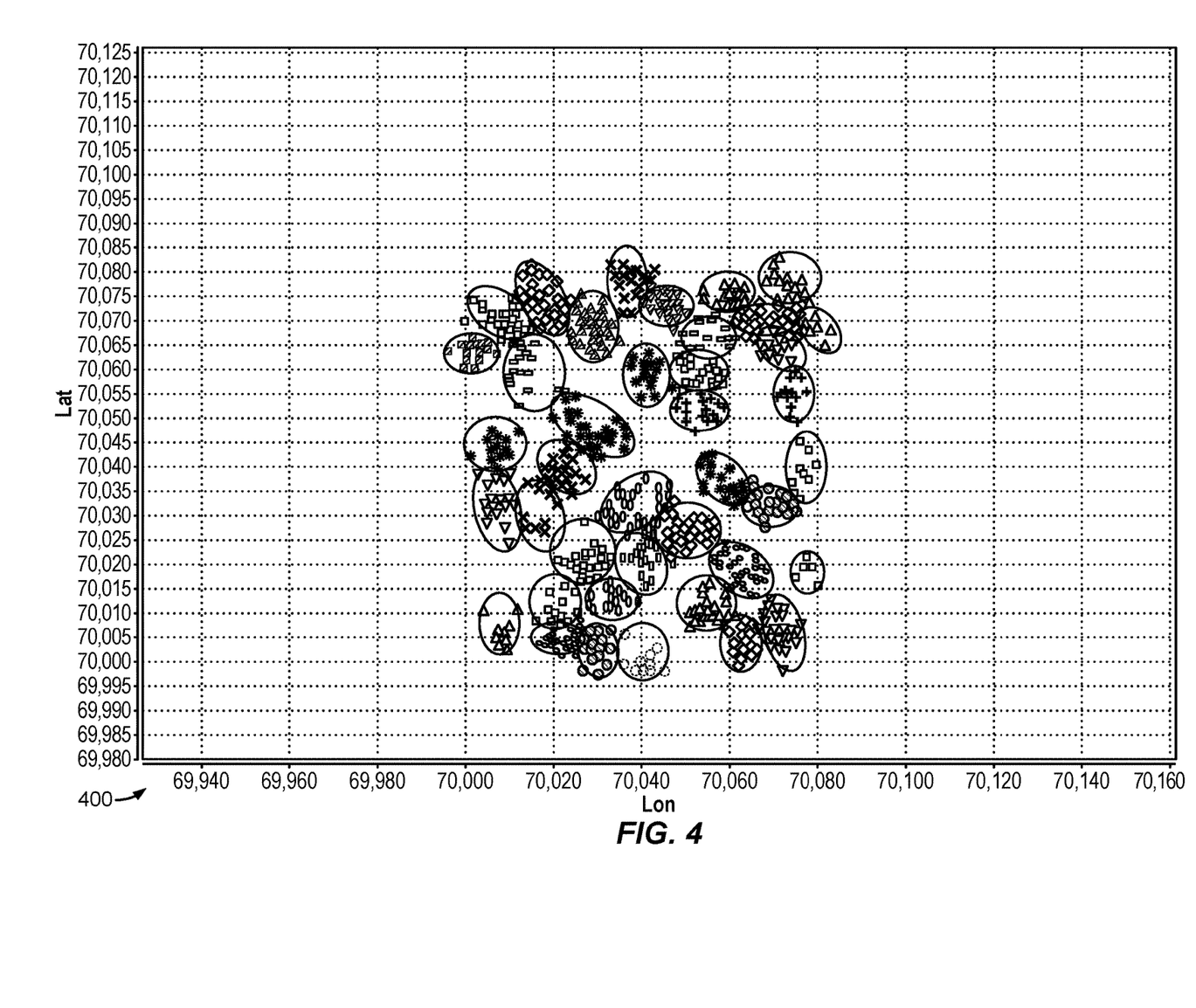
FIG. 4 is a plot of geo-location points demonstrating effectiveness of an example clustering approach.

As was indicate, a ratio portion may, for example, be capable of maximizing an average distance between centroids of a plurality of geographic clusters. A ratio portion may also be capable of minimizing an average distance between geo-location points of a cluster and a centroid of the cluster. The $$\frac{\alpha}{K \cdot N}$$

portion of relation 3 represents a normalization factor to permit, for example, comparison of clustering approaches. A normalization factor may normalize a result of a summation using a number of clusters (K) and a scaling factor ($\alpha$) that permits a tradeoff between an effect of cluster number normalization and weighted averaging. Scaling factor α may be determined by evaluating a population of geo-location points one or more times, such as using one or more evaluation metrics, and solving based, at least in part, on an expected outcome. The scaling factor α may depend at least in part on a particular population of geo-location points and may thus vary based at least in part on characteristics of the particular population (e.g., type, noise, etc.). In certain simulations or experiments, such as those implemented in connection with clustering of geo-location points of FIG. 4, a scaling factor α=3 was used, though claimed subject matter is not so limited.

In an embodiment, it may be useful to employ an evaluation metric so that it favors clustering approaches with fewer clusters. In such a case, it may be possible to "punish" clustering approaches with relatively larger numbers of clusters, such as using a square of K in a normalization portion of the evaluation metric, as shown via relation 4, below. In some instances, such as in cases with lower numbers of inputs (e.g., geo-location points) per cluster, an evaluation metric of relation 4 may provide an improvement over an evaluation metric of relation 3. However, at times, aggressive normalization of relation 4 embodiment may result in greater geographic distance between geo-location points and a centroid of a cluster by favoring clustering approaches with smaller numbers of clusters (e.g., lower K). An approach for handling cases with larger K values will be discussed hereinafter.

$$m_\alpha(C_K, \mathcal{D}_K) = \frac{\alpha}{K^2 \cdot N} \sum_{i=1}^{K} N_i \frac{\overbrace{\frac{1}{K-1} \sum_{c_j \in C_K, c_j \neq c_i} d(c_i, c_j)}^{\text{Average distance of centroids from centroid } i}}{\underbrace{\frac{1}{N_i} \sum_{x \in D_i} d(c_i, x)}_{\text{Average distance in cluster } i}} \quad (4)$$

Referring to FIG. 3 to illustrate sample distances usable in relations 3 and 4, it is noted that sample distances $r_1$-$r_8$ may be used, at least in part, such as in the denominator of relations 3 and 4, while sample values $d_1$-$d_6$ may be used, at least in part, in the numerator of relations 3 and 4. Again, as noted previously, circles in FIG. 3 are provided merely to assist in identifying cluster boundaries. Also, while in some cases, a centroid of respective cluster circles are used at least in part to represent a cluster centroid, it is to be understood that this is done merely to simplify the discussion and that actual cluster centroids may differ from the center of the circles.

Continuing with the above discussion, a normalization term, $$\frac{\alpha}{K},$$

of relations 3 and 4, may be useful for determining a clustering of geo-location points based at least in part on compared normalized clustering approaches. As noted above, in some cases, evaluation metrics in relations 3 and 4 may prefer clustering approaches with relatively smaller value of K due, at least in part, to an aggressive normalization term $$\left(\frac{\alpha}{K}\right).$$

Using such an approach may be preferred from a machine learning point of view, since aggressive normalization may tend to improve and/or reduce complexity of a particular clustering approach. However, such an approach may lead to less than desirable results due at least in part to greater geographic distance between geo-location points of clusters. For instance, an increased geographic distance may be due, at least in part, to a preference for clustering approaches with fewer clusters. In an embodiment, this result may be mitigated by using a slightly modified normalizing factor, as shown in relation 5 instead of a term $$\left(\frac{\alpha}{K}\right).$$

$$g_{\alpha,\mu,\sigma}(K) = \alpha \frac{1}{\sigma\sqrt{2\pi}} e^{-\frac{(K-\mu)^2}{2\sigma^2}} \quad (5)$$

A normalizer g, introduced in relation 5, is a scaled density function of an univariate Gaussian distribution and may act to force an evaluation metric to prefer clustering centered around a value $\mu \in \mathbb{R}$ with variance $\sigma \in \mathbb{R}$ scaled up with a value $\alpha \in \mathbb{R}$.

Referring back to example process 200 of FIG. 2, at operation 215, a geographic clustering of geo-location points within the plurality of geographic clusters may, for example be determined based, at least in part, on the first and the second evaluation metrics. The first and second evaluation metrics may, for example, be used, at least in part, to determine one or more clustering parameters, such as an appropriate number of clusters and/or number of geo-location points. For example, an evaluation metric of operation 205 in conjunction with an evaluation metric of process 210, may permit a comparison of different clustering approaches. In an embodiment, this may be accomplished using a performance evaluation metric p for evaluating different clustering approaches.

The preceding evaluation metrics may, for example, make measure an overall performance of a given clustering approach. A particular implementation of a performance evaluation metric $p = p_{\alpha,T}$ is shown in relation 6 as a combination of the above evaluation metrics in relations 1 and 3.

$$p_{\alpha,T}(C_K, D_K) = m_\alpha(C_K, D_K) \cdot s_T(C_K, D_K) \quad (6)$$

As noted above, a threshold evaluation metric, $s_T$, may return performance values greater than 0 where a clustering approach is within a desired threshold, (e.g., because an evaluation metric s returns 1 in such cases). It should be appreciated that relation 6 represents an embodiment of operation 215 of process 200 in which a first evaluation metric and a second evaluation metric may be used, at least in part, to determine clustering of geographical content.

In some instances, it may be possible to use an evaluation metric embodiment of relation 6 to yield a number K corresponding to a number of clusters to use for a particular clustering approach. Relation 7 represents one such embodiment. This relation may yield a number of clusters corresponding to a clustering approach having desired characteristics according to respective m and s evaluation metrics.

$$K^* = \underset{K=2,\ldots,K_{max}}{\operatorname{argmax}} \; p_{\alpha,T}(C_K, D_K) \quad (7)$$

Of course, as would be readily understood by those skilled in the art, a value of K* in relation 7 may depend at least partly on parameters α and T of an evaluation metric p.

At times, it may be possible to use, at least in part, the above evaluation metrics to determine a number of clusters, such as by using the below process, labeled Alg. 1. In another embodiment, it may be possible to use an evaluation metric in other ways, such as by utilizing an observation that a performance evaluation metric as a function of K-values may be concave, based on proper parameter setting. In this case, an early stopping-based algorithm may be applied. In embodiments where a performance evaluation metric may comprise a non-concave operation, it may be useful to avoid one or more local optimums of the performance evaluation metric. In an implementation, it may be possible to avoid finding a local optimum by testing actual performance against a moving average of one or more previous performance evaluation metric determinations, if applicable.

To briefly illustrate how embodiments of operations 205, 210, and 215 of process 200 may work together, such as may be embodied, for example, in computer executable instructions stored on a non-transitory computer readable medium and executable by a computing device, such as computing device 104 of FIG. 1, the following non-limiting example is provided using sample pseudo-code shown below.

---

Algorithm 1 Optimizing the number of clusters

---

1: procedure optimizeClustering(D,α,T,$K_{max}$)
2:     $p_{K^*}$ ← −∞
3:     (K*,$C_{K^*}$,$D_{K^*}$) ← undefined
4:     for K ∈ {2,...,$K_{max}$} do
5:        ($C_K$,$D_K$) ← per formClustering(D,K)    ▷ Clustering
6:        p ← $p_{α,T}$($C_K$,$D_K$)    ▷ Evaluate clustering
7:        if p > $p_{K^*}$ then
8:           $p_{K^*}$ ← p    ▷ Update performance
9:           (K*,$C_{K^*}$,$D_{K^*}$) ← (K,$C_K$,$D_K$)    ▷ Update the clustering
10:        end if
11:     end for
12:     return (K*,$C_{K^*}$,$D_{K^*}$)
13: end procedure

---

As shown above in the above sample process, labeled "Algorithm 1," in an embodiment, a plurality of inputs, D, α, T, and $K_{max}$ may be received, such as via input values. As described above, D, refers to a population of values, such as from a log of values. In one example, values may comprise geo-location points. A parameter α may provide a tradeoff between a normalization portion and a ratio portion of relations 3 and 4. A parameter T may provide a threshold value for cluster diameter. A parameter $K_{max}$ denotes a maximum number of clusters to provide an upper limit to clustering approaches that a process may test (e.g., $K_{max}$<N).

In this embodiment, variables $p_K^*$, K*, $C_K^*$, and $D_K^*$ are initiated to store results of a process, for example. An initial clustering approach may be formed based, at least in part, on a cluster number contained in a set of possible cluster numbers, such as shown by the "for loop" in line 4, above. Thus, at times, a clustering approach may, for example, be formed using an initial K value of 2. A performance of an initial clustering approach may be tested, such as using relation 6, discussed above, by way of example, and based, at least in part, on α and T parameter values received as input. A performance metric p of relation 6 may correspond to an embodiment of operations 205 and 210 of process 200. If a resulting p value is greater than an initial p value for a $p_K^*$ variable, then a resulting p, K, $C_K$, and $D_K$ values may be stored. Consequently, resulting values may be stored as $p_K^*$, K*, $C_K^*$, and $D_K^*$ if a performance of a clustering approach being tested is better than a performance of a clustering approach stored in variables (or, in the case of the initial cases, better than a performance value stored initially, for example).

Subsequent clustering approaches may thereafter be tested, using subsequent values for K (e.g., 3, 4, . . . $K_{max}$). If a resulting p value for a performance of different clustering approaches is greater than a stored $p_K^*$ value, then stored K*, $C_K^*$, and $D_K^*$ values may be overwritten. Upon completing the "for loop," resulting K*, $C_K^*$, and $D_K^*$ values may be returned and used, at least in part, for clustering. In an embodiment, an initial clustering approach may be used, at least in part, for a given set of geo-location points (e.g., from a log) and then, by way of example, a desired threshold (or other parameter) may change, and the initial clustering approach may be updated in order to reflect altered parameters and/or subsequent changes to the set of geo-location points (e.g., new geo-location points), such as discussed above.

In certain simulations or experiments, test cases were used to evaluate a number of processes for clustering of geographical content discussed above. This was done using a sample set of generated synthetic geo-location points. Tests used generated synthesized sets of geo-location points based on two received parameters: a number of clusters and a number of geo-location points. Consequently, latitude and longitude values were randomly generated around randomly generated cluster centroids. FIG. 4 shows a plots illustrating a sample result of tests of evaluation metrics on generated synthetic geo-location points.

Plot 400 of FIG. 4 illustrates a set of 1000 synthetic geo-location points of 100 clusters. In this case, it was determined using evaluation metrics that K=41 is the best clustering approach based at least partly on the threshold parameter of an evaluation metric. It is noted that in light of the small diameter and close proximity of clusters in plot 400, element numbers are not included on the plot for readability. Further, it is noted that similar to the circles indicating clusters in FIG. 3, the ellipses in FIG. 4 are merely to assist in identifying clusters and are not intended to limit clustering to particular geometric shapes.

As seen, via utilization of one or more approaches discussed above, including employing appropriate evaluation metrics, for example, a statistically significant improvement in clustering geo-location points appears to be achieved. More specifically, as illustrated, there appears to be an improvement in clustering performance with respect to a greater number of geo-location points within expected clusters. It should be noted that "overclustering" of geo-location points, which at times may occur if a ratio of geo-location points of a set to a number of expected clusters is less than approximately 10-20, may, for example, be resolved or reduced by restricting a minimum average distance (e.g., diameter) of clusters by using a smaller threshold value, T.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 5:
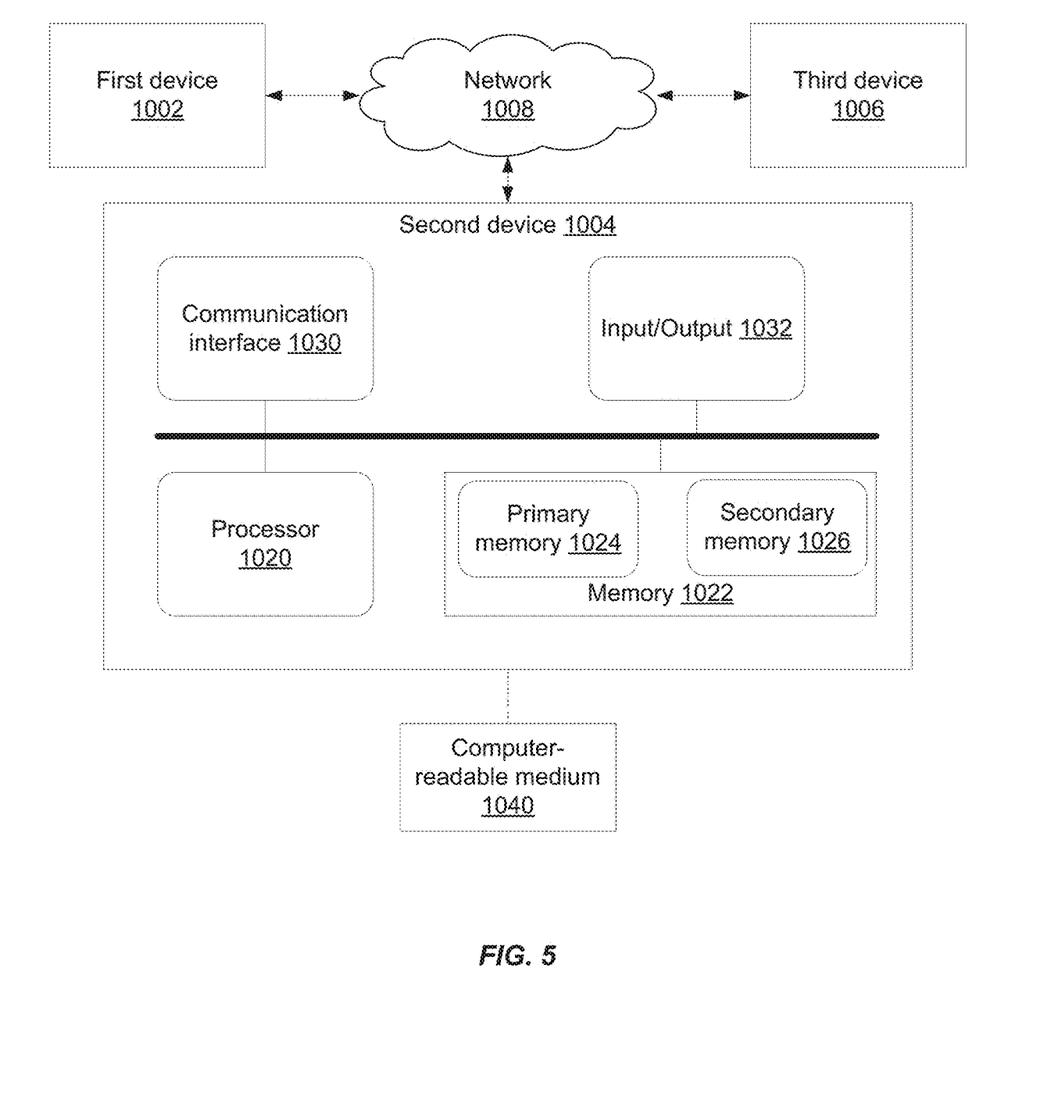
FIG. 5 is an illustration of an embodiment of a system in a networking and/or computing environment.

In one example embodiment, as shown in FIG. 5, a system embodiment may comprise a local network (e.g., device 1004 and medium 1040) and/or another type of network, such as a computing and/or communications network. For purposes of illustration, therefore, FIG. 5 shows an embodiment of a system that may be employed to implement either type or both types of networks. Network 1008 may comprise one or more network connections, links, processes, services, applications, and/or resources to facilitate and/or support communications, such as an exchange of communication signals, for example, between a computing device, such as 1002, and another computing device, such as 1006, which may, for example, comprise one or more client computing devices and/or one or more server computing device. By way of example, but not limitation, network 1008 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in the foregoing paragraphs discussing the method of FIG. 2, relations 1-7, and algorithm 1 of the present disclosure.

Referring now to FIG. 5, in an embodiment, first and third devices 1002 and 1006 may be capable of rendering a graphical user interface (GUI) for a network device and/or a computing device, for example, so that a user-operator may engage in system use. Device 1004 may potentially serve a similar function in this illustration. Likewise, in FIG. 5, computing device 1002 ('first device' in figure) may interface with computing device 1004 ('second device' in figure), which may, for example, also comprise features of a client computing device and/or a server computing device, in an embodiment. Processor (e.g., processing device) 1020 and memory 1022, which may comprise primary memory 1024 and secondary memory 1026, may communicate by way of a communication bus 215, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 1004, as depicted in FIG. 5, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, OSX, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 5, computing device 1002 may provide one or more sources of executable computer instructions in the form physical states and/or signals (e.g., stored in memory states), for example. Computing device 1002 may communicate with computing device 1004 by way of a network connection, such as via network 1008, for example. As previously mentioned, a connection, while physical, may not necessarily be tangible. Although computing device 1004 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1022 may comprise any non-transitory storage mechanism. Memory 1022 may comprise, for example, primary memory 1024 and secondary memory 1026, additional memory circuits, mechanisms, or combinations thereof may be used. Memory 1022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1022 may be utilized to store a program of executable computer instructions. For example, processor 1020 may fetch executable instructions from memory and proceed to execute the fetched instructions. Memory 1022 may also comprise a memory controller for accessing device readable-medium 1040 that may carry and/or make accessible digital content, which may include code, and/or instructions, for example, executable by processor 1020 and/or some other device, such as a controller, as one example, capable of executing computer instructions, for example. Under direction of processor 1020, a non-transitory memory, such as memory cells storing physical states (e.g., memory states), comprising, for example, a program of executable computer instructions, may be executed by processor 1020 and able to generate signals to be communicated via a network, for example, as previously described. Generated signals may also be stored in memory, also previously suggested.

Memory 1022 may store electronic files and/or electronic documents, such as relating to one or more users, and may also comprise a device-readable medium that may carry and/or make accessible content, including code and/or instructions, for example, executable by processor 1020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 1020 may comprise one or more circuits, such as digital circuits, to perform at least a portion of a computing procedure and/or process. By way of example, but not limitation, processor 1020 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 1004 as including a component 1032 operable with input/output devices, for example, so that signals and/or states may be appropriately communicated between devices, such as device 1004 and an input device and/or device 1004 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
    computing a first evaluation metric descriptive of a distribution of geo-location points within a cluster of a first plurality of geographic clusters based, at least in part, on an average distance between a centroid of the cluster and the geo-location points within the cluster, wherein a first distance between the centroid and a first geo-location point of the geo-location points is different than a second distance between the centroid and a second geo-location point of the geo-location points;
    computing a second evaluation metric descriptive of coherence of the first plurality of geographic clusters based, at least in part, on an average distance between centroids of the first plurality of geographic clusters, wherein a third distance between a first centroid of the centroids and a second centroid of the centroids is different than a fourth distance between a third centroid of the centroids and a fourth centroid of the centroids;
    determining a number of geographic clusters in which to cluster geo-location points within the first plurality of geographic clusters based, at least in part, on the first evaluation metric and the second evaluation metric; and
    clustering one or more geo-location points including the geo-location points within the first plurality of geographic clusters to generate a second plurality of geographic clusters having the number of geographic clusters.

2. A system comprising:
at least one computing device, the at least one computing device configured to:
    compute a first evaluation metric to be descriptive of a distribution of geo-location points within a cluster of a first plurality of geographic clusters based, at least in part, on an average distance between a centroid of the cluster and the geo-location points within the cluster, wherein a first distance between the centroid and a first geo-location point of the geo-location points is different than a second distance between the centroid and a second geo-location point of the geo-location points;
    compute a second evaluation metric to be descriptive of coherence of the first plurality of geographic clusters based, at least in part, on an average distance between centroids of the first plurality of geographic clusters, wherein a third distance between a first centroid of the centroids and a second centroid of the centroids is different than a fourth distance between a third centroid of the centroids and a fourth centroid of the centroids;
    determine a number of geographic clusters in which to cluster geo-location points within the first plurality of geographic clusters based, at least in part, on the first evaluation metric and the second evaluation metric; and
    cluster one or more geo-location points including the geo-location points within the first plurality of geographic clusters to generate a second plurality of geographic clusters having the number of geographic clusters.

3. A computer program product comprising one or more non-transitory computer-readable media having computer program instructions stored therein, the computer program instructions being configured such that, when executed by one or more computing devices, the computer program instructions cause the one or more computing devices to:
    compute a first evaluation metric descriptive of a distribution of geo-location points within a cluster of a first plurality of geographic clusters based, at least in part, on an average distance between a centroid of the cluster and the geo-location points within the cluster, wherein a first distance between the centroid and a first geo-location point of the geo-location points is different than a second distance between the centroid and a second geo-location point of the geo-location points;

compute a second evaluation metric descriptive of coherence of the first plurality of geographic clusters based, at least in part, on an average distance between centroids of the first plurality of geographic clusters, wherein a third distance between a first centroid of the centroids and a second centroid of the centroids is different than a fourth distance between a third centroid of the centroids and a fourth centroid of the centroids;

determine a number of geographic clusters in which to cluster geo-location points within the first plurality of geographic clusters based, at least in part, on the first evaluation metric and the second evaluation metric; and cluster one or more geo-location points including the geo-location points within the first plurality of geographic clusters to generate a second plurality of geographic clusters having the number of geographic clusters.

4. The method of claim 1, comprising:
determining the average distance between the centroid of the cluster and the geo-location points within the cluster based, at least in part, on an average of:
the first distance between the centroid of the cluster and the first geo-location point of the geo-location points within the cluster; and
one or more other distances, wherein each distance of the one or more other distances is between the centroid of the cluster and at least one geo-location point of the geo-location points within the cluster.

5. The method of claim 1, comprising:
determining the average distance between the centroids of the first plurality of geographic clusters based, at least in part, on an average of:
the third distance between the first centroid of the centroids and the second centroid of the centroids; and
one or more other distances, wherein each distance of the one or more other distances is between at least one centroid of the centroids and at least another centroid of the centroids.

6. The method of claim 1, wherein the second evaluation metric is computed based, at least in part, on a ratio comprising the average distance between the centroids of the first plurality of geographic clusters.

7. The method of claim 1, wherein the second evaluation metric is determined based, at least in part, on a ratio of the average distance between the centroids of the first plurality of geographic clusters to the average distance between the centroid of the cluster and the geo-location points of the cluster.

8. The method of claim 1, wherein determining the number of geographic clusters in which to cluster the geo-location points within the first plurality of geographic clusters is further based, at least in part, on a penalty factor.

9. The method of claim 1, wherein the first evaluation metric comprises an index function that returns a binary value responsive to whether the first evaluation metric is true.

10. The method of claim 1, wherein determining the number of geographic clusters in which to cluster the geo-location points within the first plurality of geographic clusters is further based, at least in part, on a normalizing factor.

11. The method of claim 1, wherein determining the number of geographic clusters in which to cluster the geo-location points within the first plurality of geographic clusters is based, at least in part, on the first evaluation metric and the second evaluation metric comprises:
determining one or more clustering parameters based, at least in part, on the first evaluation metric and the second evaluation metric; and
clustering of a plurality of geo-location points, including the geo-location points of the first plurality of geographic clusters, within the second plurality of geographic clusters using the one or more clustering parameters.

12. The method of claim 1, wherein determining the number of geographic clusters in which to cluster the geo-location points within the first plurality of geographic clusters based, at least in part, on the first evaluation metric and the second evaluation metric comprises:
evaluating a clustering process used to cluster the geo-location points within the first plurality of geographic clusters; and
clustering of a plurality of geo-location points, including the geo-location points within the first plurality of geographic clusters, within the second plurality of geographic clusters based, at least in part, on a result of evaluating the clustering process.

13. The method of claim 1, each geo-location point including at least one value that indicates at least one of a geographic location of one or more users or of a point of interest of the one or more users.

14. The method of claim 1, each geo-location point corresponding to one or more content items indicative of a geographical location associated with the geo-location point.

15. The system of claim 2, wherein the first evaluation metric is descriptive of a diameter of the cluster of the first plurality of geographic clusters.

16. The system of claim 2, wherein the first evaluation metric is computed based, at least in part, on a threshold process configured to minimize the average distance between the centroid of the cluster and the geo-location points within the cluster.

17. The system of claim 2, wherein the second evaluation metric is computed based, at least in part, on a ratio comprising the average distance between the centroids of the first plurality of geographic clusters.

18. The system of claim 2, wherein the second evaluation metric is determined based, at least in part, on a ratio of the average distance between the centroids of the first plurality of geographic clusters to the average distance between the centroid of the cluster and the geo-location points of the cluster.

19. The computer program product of claim 3, wherein the determining the number of geographic clusters in which to cluster the geo-location points within the first plurality of geographic clusters is further based, at least in part, on a penalty factor.

20. The computer program product of claim 3, wherein the determining the number of geographic clusters in which to cluster the geo-location points within the first plurality of geographic clusters is further based, at least in part, on a normalizing factor.

21. The method of claim 8, wherein the penalty factor comprises an indication of a number of clusters in the first plurality of geographic clusters.

22. The method of claim 10, wherein the normalizing factor is based, at least in part, on a scaled density function of a univariate Gaussian distribution.

23. The computer program product of claim 20, wherein the normalizing factor is based, at least in part, on a scaled density function of a univariate Gaussian distribution.

* * * * *